United States Patent [19]
Bereisa, Jr.

[11] 3,912,993
[45] Oct. 14, 1975

[54] INDUCTION MOTOR SPEED CONTROL CIRCUIT

[75] Inventor: Jonas Bereisa, Jr., Santa Barbara, Calif.

[73] Assignee: Aerojet-General Corporation, El Monte, Calif.

[22] Filed: July 24, 1974

[21] Appl. No.: 491,564

[52] U.S. Cl. .................. 318/230; 318/231; 318/415
[51] Int. Cl.[2] ........................................... H02P 7/42
[58] Field of Search ........... 318/171, 227, 230, 231, 318/392, 397, 398, 415, 416

[56] References Cited
UNITED STATES PATENTS

| | | | |
|---|---|---|---|
| 3,781,616 | 12/1973 | Mokrytzki et al. | 318/392 X |
| 3,787,724 | 1/1974 | Pedersen et al. | 318/231 X |
| 3,819,996 | 6/1974 | Habisohn | 318/227 X |

*Primary Examiner*—G. Z. Rubinson
*Attorney, Agent, or Firm*—John S. Bell

[57] ABSTRACT

A motor speed control circuit that provides rapid motor acceleration by increasing frequency of an AC motor drive signal at a rate controlled in accordance with actual increasing motor speed, and also by increasing the voltage to frequency ratio of that signal, is illustrated herein. The circuit provides a command signal having a frequency representing desired motor speed, a reference signal having a frequency representing a speed slightly greater than the actual operating speed of the induction motor, and a motor drive signal having a frequency equal to the lesser of the command and reference signal frequencies. When matched with the frequency of the reference signal, the drive signal frequency increases at a rate controlled in accordance with actual increasing motor speed, and thereby provides rapid motor acceleration. In order to further provide rapid acceleration, the voltage-to-frequency ratio of the drive signal is increased when the frequency of the drive signal is matched to the frequency of the reference signal.

6 Claims, 1 Drawing Figure

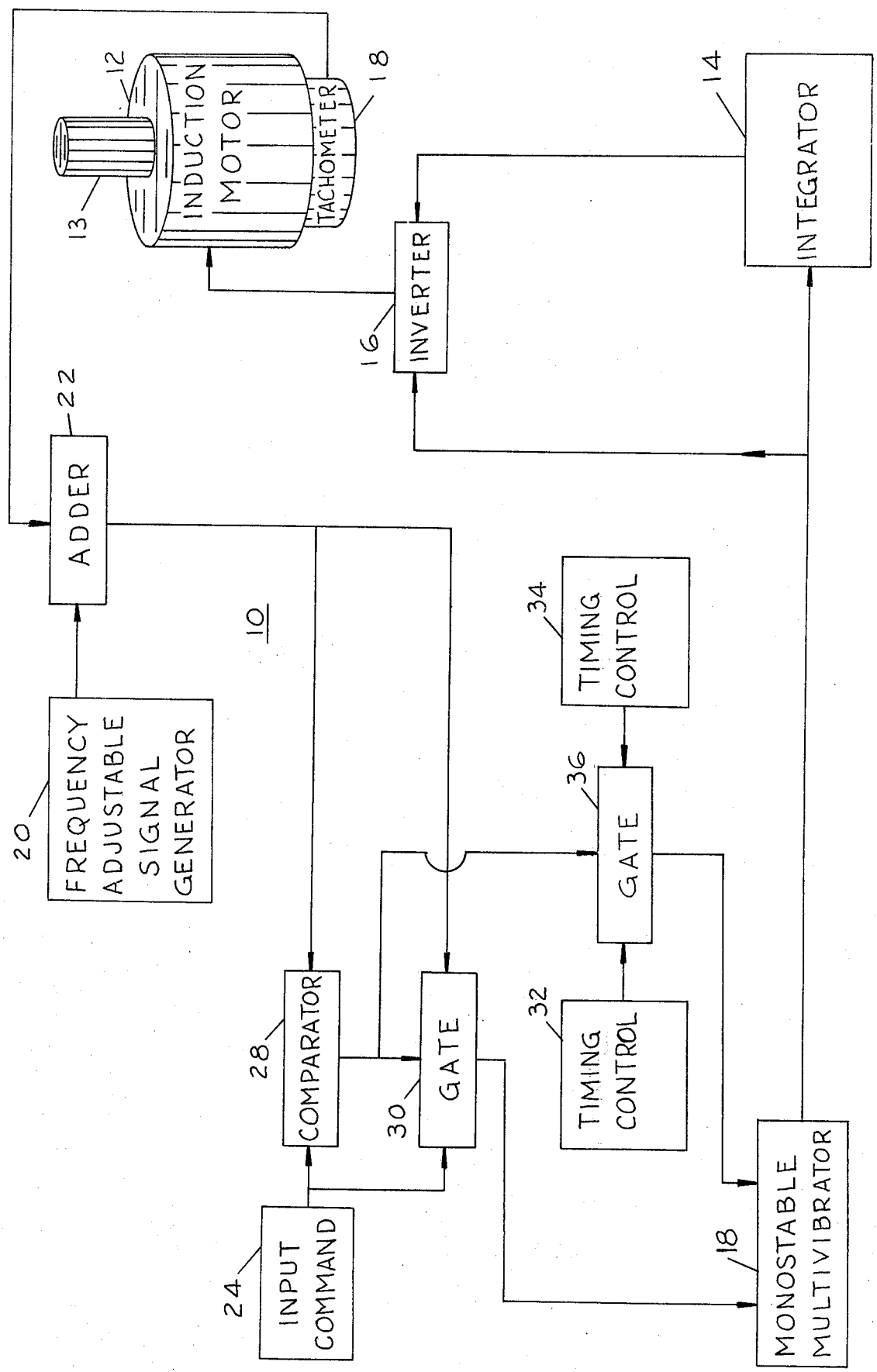

INDUCTION MOTOR SPEED CONTROL CIRCUIT

BACKGROUND OF THE INVENTION

1. Field of the Invention

Control circuits for electric induction motors.

2. Brief Description of the Prior Art

Most induction motor control circuits provide an AC electric output signal for driving an induction motor, and vary the frequency of those signals in order to vary motor speed. The frequency of a drive signal determines the motor speed, and the voltage level of that signal determines torque. The specific configuration of each particular induction motor establishes an optimum voltage-to-frequency ratio required of the signal supplied to drive that motor. A drive signal having a voltage-to-frequency ratio that is lower than the predetermined optimum value will cause the motor to operate at less than its rated output power. A drive signal having a voltage-to-frequency ratio higher than the optimum value for the motor being driven by that signal will cause the motor to overheat and eventually burn out. Common induction motor control circuits thus vary the voltage of the drive signal along with frequency in a manner that maintains a fixed voltage-to-frequency ratio as the frequency is varied to provide different motor speeds.

There are several induction motor control circuits that do vary the voltage-to-frequency ratio of an induction motor drive signal in order to achieve different objectives. One such circuit is based on the assumption that it is always desirable to operate an induction motor either at or near its full speed, and that increased torque is always desirable to rapidly accelerate the motor to that speed. This circuit provides a variable AC drive signal, and increases the voltage-to-frequency ratio of that signal whenever the motor is operating at a slow speed. The primary drawback of this circuit is that it often provides increased voltage when that voltage is not wanted and can cause damage. It is often desired in many applications to operate an induction motor at a relatively slow speed for a considerable time. Another known induction motor control circuit varies the voltage-to-frequency ratio of the signal driving an induction motor in order to cause that motor to provide an output that simulates the torque-speed characteristics of a combustion motor. This circuit monitors torque to achieve engine control. That is, it provides a control signal representing engine torque desired at different speeds, compares this with actual torque generated at a particular speed, and increases the voltage level of the induction motor drive signal whenever actual torque is below the desired value. The chief drawback of this circuit is that it is substantially more complicated than is desirable for a simple speed control circuit.

SUMMARY OF THE INVENTION

This invention is a simple but effective circuit for controlling the operating speed of an induction motor that is also capable of accelerating that operating speed very rapidly. The control circuit provides an AC electric output signal for driving an induction motor, and varies the frequency of that output to provide different motor speeds. The voltage-to-frequency ratio of the motor driving signal is normally maintained at a level that is predetermined by the configuration of the motor being driven to be optimum for that motor. But, the voltage-to-frequency ratio is increased when the operating speed of the induction motor is actually being accelerated in order to thereby increase the rate of motor acceleration. The circuit includes apparatus for generating a command signal having a frequency representing desired motor speed and a reference signal having a frequency representing a speed slightly greater than the actual operating speed of the motor being driven. The frequency of the motor driving signal is matched to the lesser frequency of the command and reference signals. When the motor is being accelerated to a desired speed, the reference signal will have the lower frequency, and the frequency of the motor driving signal will be matched to it. Since the reference signal has a frequency representing a speed slightly greater than the actual motor speed, the motor is accelerated when the frequency of the drive signal is matched to the reference signal. This further increases the frequency of the reference signal, which further accelerates the motor until it reaches a desired operating speed. The frequency of the motor driving signal thus increases at a rate controlled in accordance with actual increasing motor speed. This controlled frequency increase provides rapid motor acceleration. The circuit further provides rapid acceleration by increasing the voltage-to-frequency ratio of the motor driving signal whenever that signal is provided with a frequency equal to that of the reference signal. Once a desired speed is reached, the command signal will have the lesser frequency, the frequency of the motor driving signal will be matched to it, and the voltage-to-frequency ratio of that signal is reduced to the optimum value for the motor being driven. The circuit thus provides rapid motor acceleration by increasing the voltage-to-frequency ratio of the motor driving signal when that increase is needed and also avoids overheating and burnout problems by not increasing that ratio when it is not needed. In one application involving rapid start/stop motor operation, acceleration times were improved by 40 percent over the times achieved when the voltage-to-frequency ratio was not increased, with a corresponding increase of only 5 percent in motor heating.

The circuit embodiment illustrated herein includes apparatus for providing a train of discrete pulses at a rate determined by the lesser of the command and reference signal frequencies. The pulses are integrated to DC voltage level signal, and the DC voltage is then at a rate determined by the repitition rate of the pulses in order to convert that voltage to an AC signal for driving an induction motor. The pulses normally are provided with predetermined, fixed durations. But, during acceleration, when the pulses are provided at a rate determined by the frequency of the reference signal, the duration of each pulse is extended in order to increase the voltage level provided by integrating those pulses, and thereby increase the voltage-to-frequency ratio of the output motor drive signal.

BRIEF DESCRIPTION OF DRAWING

The objects, features, and advantages of this invention, which is defined by the appended claims, will become further apparent from a consideration of the following description of the accompanying FIGURE, which is a schematic, box level circuit diagram of one embodiment of the induction motor speed control circuit of this invention.

DETAILED DESCRIPTION OF THE DRAWING

The FIGURE illustrates a circuit 10 for controlling operation of an induction motor 12 having a rotatable output shaft 13. Control circuit 10 includes an integrator 14 and inverter 16 for together providing an output for driving induction motor 12. For simplicity, only a single line is shown interconnecting inverter 16 with motor 12. But, induction motors having multiple drive signal receiving stator poles, and inverters designed to provide an appropriate signal to each of those poles, are known and within the scope of this circuit. Control circuit 10 also includes a monostable multivibrator 18 connected to provide a signal comprising a sequence of discrete signal pulses to integrator 14 and inverter 16 in order to control the frequency and voltage level of the output signal provided by those elements to drive motor 12. The frequency of the signal driving motor 12 is controlled by controlling the frequency (pulse repitition rate) of the output signal provided by multivibrator 18. The apparatus for controlling that frequency provides triggering pulses to multivibrator 18 at an appropriate rate, and includes: a tachometer 20, frequency adjustable signal generator 22, and adder 24 for together providing a triggering pulse train type reference signal having a frequency representing a speed slightly greater than the operating speed of motor 12; an input command control 26 for providing a triggering pulse train type control signal having a frequency representing a desired motor speed; and a comparator 28 and gate 30 for comparing the frequencies of input command and reference signals and transmitting the one of those signals having the lesser frequency to a monostable multivibrator 18. The voltage level of the signal driving motor 12 is controlled by controlling the durations of the output pulses provided by multivibrator 18. To provide that pulse duration control, circuit 10 includes a first timing control 32 for providing the output pulses from multivibrator 18 with durations that cause motor driving signal to have an optimum voltage-to-frequency ratio for motor 12, a second timing control 34 for providing the output pulses from multivibrator 18 with longer durations to provide the motor with a higher voltage-to-frequency ratio, and a gate 36 responsive to the output from comparator 28 for controllable interconnecting controls 32 and 34 with multivibrator 18. The configuration required of timing controls 32 and 34 depend upon the construction of multivibrator 18. But, many monostable multivibrators provide output pulses of different durations when appropriately connected to different electrical resistances. For such a multivibrator, timing controls 32 and 34 may simply be different valued resistors.

In operation, generator 22 is adjusted to provide triggering pulses at a relatively low rate predetermined in accordance with the manner in which it is desired to operate motor 12. And, input command 26 is set to provide a command triggering pulse at a rate that represents a desired motor operating speed. Assuming motor 12 is starting from rest, the reference signal supplied by adder 24 to comparator 28 and gate 30 will initially consist of only the signal from generator 22 and will thus have a frequency much lower than that of the command signal. Comparator 28 thus provides an output that causes gate 30 to transmit the reference signal to monostable multivibrator 18, and also causes gate 30 to interconnect monostable multivibrator 18 with timing control 34. Control 34 causes monostable multivibrator 18 to provide an output pulse having a predetermined long duration in response to each received reference signal pulse. Integrator 14 integrates the pulses provided by multivibrator 18 to provide a DC signal having a voltage level determined at least in part by the durations of the multivibrator output pulses. And, inverter 16 inverts the DC signal from integrator 14 at a rate determined by the pulse repetition rate of the signal from multivibrator 18 to convert the DC signal to an AC signal for driving motor 12.

This drive signal starts motor output shaft 13 rotating. As shaft 13 rotates, tachometer 20 provides output pulses at a rate determined by the rate of shaft rotation. This tachometer output signal increases the frequency of the reference signal provided by adder 24. which in turn causes monostable multivibrator 18 to provide output pulses at a faster rate and thus increase the operating speed of motor 12. During acceleration, the frequency of the motor driving signal provided by circuit 10 thus increases in accordance with actual increasing of motor speed. And, that signal is provided with a high voltage-to-frequency ratio. Both of these factors provide rapid motor acceleration.

When motor 12 reaches the commanded speed, the frequency of the reference signal from adder 24 will exceed that of the command signal from input 26. Comparator 28 then provides a second output causing gate 30 to transmit the command signal instead of the reference signal to monostable multivibrator 18, and also causing gate 36 to interconnect multivibrator 18 with timing control 32 instead of control 34. The frequency of the motor driving signal is thus fixed at that of the input command signal to prevent motor 12 from exceeding the commanded speed. And, timing control 32 provides the output pulses from monostable multivibrator 18 with shorter durations that reduce the voltage-to-frequency ratio of the motor driving signal to an optimum value for fixed speed operation.

Having thus described the construction, operation, and advantages of one embodiment of this invention, a number of modifications will readily occur to those skilled in the art.

Therefore, what is claimed is:

1. An induction motor speed control circuit capable of rapidly increasing the operating speed of an induction motor, said control circuit comprising:

drive signal means for providing a cyclic electric signal for driving an induction motor, the frequency of said motor driving signal at least partially determining the operating speed of the motor;

command signal means for providing a cyclic command signal having a frequency representing desired motor speed;

reference signal means for providing a cyclic reference signal having a frequency representing a speed slightly greater than the operating speed of the induction motor;

frequency control means for providing said motor driving signal with a frequency equal to the frequency of the one of said command and reference signals having the lower frequency, the frequency of said motor driving signal increasing at a rate controlled in accordance with actual increasing speed to provide rapid motor acceleration when equal to the frequency of said reference signal; and voltage control means for increasing the voltage-to-frequency ratio of said electric drive signal whenever said motor driving signal is provided with a frequency equal to the frequency of said reference signal, thereby to further provide rapid motor acceleration.

2. A control circuit of claim 1 in which said voltage control means include:
   a first control means for providing said drive signal with a first voltage-to-frequency ratio when said motor driving signal has a frequency equal to the frequency of said command signal; and
   a second control means for providing said drive signal with a second, higher voltage-to-frequency ratio when said motor driving signal has a frequency equal to the frequency of said reference signal.

3. The control circuit of claim 1, in which:
   said drive signal means comprise means for receiving a control signal and providing a motor driving signal having a frequency and voltage determined by said control signal;
   said frequency control means comprise means for providing said drive signal means with a control signal having a frequency equal to the lesser of said command signal and reference signal frequencies; and
   said voltage control means comprise means for controlling one parameter of said control signal.

4. The control circuit of claim 3, in which:
   said drive signal means comprise means for integrating said control signal to provide a DC output voltage and means for inverting said output voltage at a rate determined by the frequency of said control signal to thereby provide said motor driving signal;
   said control signal providing means comprise means for providing a pulse train signal; and
   said voltage control means comprise means for controlling the durations of the pulses of said pulse train signal to thereby control the voltage level of said DC output.

5. Said control circuit of claim 4, in which:
   said voltage control means comprise:
      first timing control means for providing the pulses of said pulse train signal with first predetermined durations;
      second timing control means for providing the pulses of said pulse train signal with second durations longer than said first durations; and
      first gating means for controllably interconnecting said first and second timing means with said pulse train control signal providing means.

6. Said control circuit of claim 5, in which:
   said control signal providing means comprise multivibrator means for receiving an input signal and providing discrete signal pulses at a rate determined by the frequency of the received input signal;
   said frequency control means further include second gating means for controlling transmission of said command and reference signals to said multivibrator means, and means for comparing said command and reference signals and providing an output causing said second gating means to transmit the one of said command and reference signals having the lower frequency to said multivibrator means; and
   said first gating means comprise means responsive to said comparator output for interconnecting said first time control with said multivibrator means when said comparator output comprises an output for causing said command signal to be transmitted to said multivibrator means, and for interconnecting said second timing means with said multivibrator means when said comparator output comprises an output for causing said reference signal to be transmitted to said multivibrator means.

* * * * *